United States Patent [19]

Kaminski

[11] Patent Number: 5,328,545
[45] Date of Patent: Jul. 12, 1994

[54] DEVICE FOR OVERLAPPING WELDING OF FOIL EDGES

[76] Inventor: Renald Kaminski, An der Friedenberg 2, W-5130 Geilenkirchen, Fed. Rep. of Germany

[21] Appl. No.: 932,202

[22] Filed: Aug. 20, 1992

[30] Foreign Application Priority Data

Aug. 24, 1991 [DE] Fed. Rep. of Germany ....... 9110487

[51] Int. Cl.$^5$ .............................................. B30B 5/02
[52] U.S. Cl. ................................ 156/583.1; 156/499; 100/93 RP; 100/171; 100/283; 100/289
[58] Field of Search ............ 156/358, 360, 499, 583.1; 100/93 RP, 171, 283, 289

[56] References Cited

U.S. PATENT DOCUMENTS

| | | | |
|---|---|---|---|
| 3,624,836 | 11/1971 | Rohdin | 219/243 |
| 3,828,646 | 10/1974 | Borse et al. | 409/136 |
| 3,960,071 | 6/1976 | Mayer et al. | 100/283 X |
| 4,146,419 | 3/1979 | Neidhart | 156/391 |
| 4,769,102 | 9/1988 | Neumüller et al. | 156/359 |
| 4,855,004 | 8/1989 | Chitjian | 156/359 |
| 4,960,478 | 10/1990 | Newkirk et al. | 156/228 |

FOREIGN PATENT DOCUMENTS

| | | |
|---|---|---|
| 2520217 | 11/1976 | Fed. Rep. of Germany . |
| 3535759 | 5/1986 | Fed. Rep. of Germany . |
| 8816287 | 4/1989 | Fed. Rep. of Germany . |
| 4000017 | 7/1991 | Fed. Rep. of Germany . |

*Primary Examiner*—David A. Simmons
*Assistant Examiner*—Paul M. Rivard
*Attorney, Agent, or Firm*—Joseph W. Berenato, III

[57] ABSTRACT

The invention relates to a device for welding overlapping foil edges with a heater, with contact rollers for the exterior contact at the foil edges as well as at least one height adjustment device, whereby the height adjustment device has a guide device for movement control of the respective contact roller essentially transversely to the processing direction of the foil edges, as well as a drive for moving the contact roller.

17 Claims, 2 Drawing Sheets

DEVICE FOR OVERLAPPING WELDING OF FOIL EDGES

BACKGROUND OF THE INVENTION

The invention relates to a device for welding overlapping foil edges with a heater, with contact rollers for the exterior contact at the foil edges as well as at least one height adjustment device, whereby the height adjustment device has a guide device for movement control of the respective contact roller essentially transversely to the processing direction of the foil edges, as well as a drive for moving this contact roller.

Devices for the overlapping welding of foil edges are described in DE-OS 35 35 759, DE-OS 40 00 017, and DE-GM 88 16 287.7. The devices are used particularly for welding foils in waste dump construction. Hereby high requirements are posed on the quality of the welding.

During the welding of the foil edges, the device drives along the two edges of the foils, whereby the foil edges are arranged so as to be overlapping. In the process, the foil edges enter the device on top of each other and are then guided over a heater which as a rule is constructed in a wedge-shape. This wedge-shaped heater is arranged lying down, i.e. the two partial surfaces which converge backwards toward the wedge tip are positioned on top of each other. Hereby the heater is oriented with its obtuse end toward the entrance of the foil edges into the device.

Each wedge surface of the heater may be divided into two partial wedge surfaces which are arranged at a distance from each other and between which a groove extends. The top foil edge is hereby passed over the two top partial wedge surfaces and the bottom foil edge is passed over the two bottom partial wedge surfaces. Both of the respective superposed partial wedge surfaces combine toward the back, forming a line-shaped wedge tip where the two foil edges are brought together.

The heater has several heating elements which ensure heating of the wedge surfaces which function as heating surfaces. Hereby the heating plasticizes the foil edges in the area of the partial wedge surfaces in such a way that they are welded together after being brought together, resulting, in particular due to the partial wedge surfaces which are arranged at a distance from each other, in two weld seams which extend parallel to each other at a corresponding distance. Between the weld seams a channel is formed which, in order to test the tightness of the weld seams, is closed off at one end, whereupon air is introduced into its other end. If there is no leaking of air during this test, the weld seams are correct.

In order that the foil edges are guided past the heating surfaces of the heater with contact, and in particular are then passed together with the pressure required for welding, contact rollers have been provided in the heater area itself and behind the heater, i.e. one contact roller for each of the two parallel weld seams. If the contact rollers are located behind the heater, two contact rollers are arranged on top of each other in order to be able to exert pressure from both sides on the corresponding heated areas of the foil edges. One pair each of the contact rollers behind the heater simultaneously function as drive rollers, i.e. at least one of the rollers is equipped with a drive which pulls the foil edges into the device and hereby drives the device forward.

In the devices according to DE-OS 35 35 759 and German OS 40 00 017 contact rollers are suspended on plate springs which press them with a preload against the heater or against a stationary contact roller facing it. There is no height adjustment device to adapt the device to different thicknesses of the foil edges. But a height adjustment device is found in the device according to DE-GM 88 16 287.7. It consists of a pneumatic cylinder whose piston rod acts directly on one of two opposing contact rollers. Hereby the contact roller movement is essentially guided transversely to the processing direction of the foil edges by the pneumatic cylinder, i.e. via the guiding of its piston and piston rod.

Such a height adjustment device on the one hand presupposes the existence of a source of compressed air. This significantly restricts the application of the device. Especially in the waste dump field where the device is used primarily, compressed air sources are frequently not available. Another disadvantage is that no gap between the two contact rollers or between one contact roller and the heater can be set, which makes it difficult to generate reproducible pressure conditions. However, the quality of the weld seams when connecting two foil edges also depends essentially on the contact pressure generated by the contact rollers. Finally, with the pressures occurring here, the pneumatic cylinders have a tendency to jam the piston rod in the cylinder.

SUMMARY OF THE INVENTION

The invention is based on the task of constructing the height adjustment device in a device of the initially cited type in such a way that the movement of the respective contact roller is guided flawlessly.

According to the invention this task is solved in that the drive comprises a spindle which may be rotated by a torque motor and which is connected via a spindle nut to the contact roller and is positioned so that it may slide axially, whereby the spindle is supported at a spring device in such a way that the contact roller is spring-mounted in the direction facing away from the foil edges.

According to the invention, the height adjustment device uses a spindle driven by a torque motor, e.g. an electric motor, which is able to slide axially, but is supported in this direction by a spring device. With this spindle the respective contact roller may be adjusted essentially transversely to the processing direction of the foil edges, whereby the spindle permits a very accurate adjustment of the free gap for the passage of the foil edge(s). In this way the device may be set to the appropriate thickness even prior to the pulling in of the foil edges, a process which may be reproduced at any time. The spring-mounted axial support of the spindle ensures that no impermissible stresses or obstructions occur during the passage of the foil edges, especially if the foil edges fluctuate in their thicknesses, are profiled, or carry dirt, e.g. rocks pressed into them. The respective contact roller is then able to yield against the effect of the spring device by widening the gap and then springs back into the intended position. The invented separation of the adjustment of the contact roller and spring-mounting to the extent that the same spring effect is always present in each position of the contact roller therefore has significant advantages.

Execution of the invention provides that the torque motor is kept stationary in the device and is connected to the spindle via a sliding coupling.

According to another characteristic of the invention it is proposed that the spindle nut or an additional spindle nut is supported at the device by a support element against transverse forces which act on the spindle. This support eliminates possible bending forces from the spindle, so that the spindle no longer needs to absorb them and therefore may be of light construction. The support element may be constructed as a support strut coupled to the device, whereby the spindle then should be able to slightly swivel. As an alternate, the support element is constructed in the form of at least one support roller which runs on a guide track extending parallel to the spindle axis.

The invention furthermore provides that the spring device has at least one helical spring which surrounds a spindle extension and which supports itself on one side at the spindle and on the other side e.g. at the device case. It is also possible to provide spindle extensions surrounded by helical springs on both sides, e.g. to achieve a higher spring force. Hereby it is possible to provide steps for the helical springs which are arranged in such a manner that one of the helical springs contacts its corresponding stop only after the other helical spring has traveled a certain distance. In this way a gradually increasing spring force is obtained during the spring operation. It is preferred that the helical springs are supported on the bearing cases of the spindle which are present in any case.

According to the invention it is also proposed that the axis of the spindle extends parallel to the processing direction of the foil edges and the spindle nut is connected via a connecting rod to the contact roller. This construction is particularly space-saving and permits sensitive adjustment of the contact roller. Hereby the connecting rod should be constructed as a connecting bow which borders the contact roller on both sides. It is useful that the connecting rod extends from the contact roller at an angle in the spring direction of the spring device to the spindle nut.

Various possibilities exist for constructing the guide device for the respective contact roller. Especially simple is the construction as a swiveling guide rod, whereby the extent of the invention includes spanning of the respective contact roller by two guide rods. It is useful that the guide rod extends essentially parallel to the processing direction of the foil edges so that the swivel movement of the contact roller takes place essentially vertically.

The height adjustment device according to the invention is particularly suitable for the paired, superposed contact rollers behind the heater. Hereby it is sufficient if only one contact roller of a pair of contact rollers is equipped with a height adjustment device according to the invention, i.e. preferably the respective top contact roller.

BRIEF DESCRIPTION OF THE DRAWINGS

The drawings show the invention in more detail, using an embodiment.

FIG. (1) shows a lateral view of the invented device;

Figure 2:
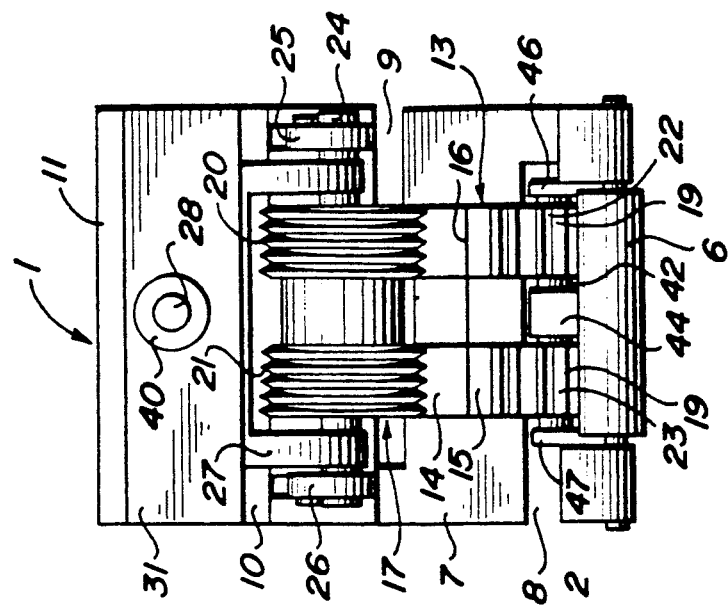
Figure 1:
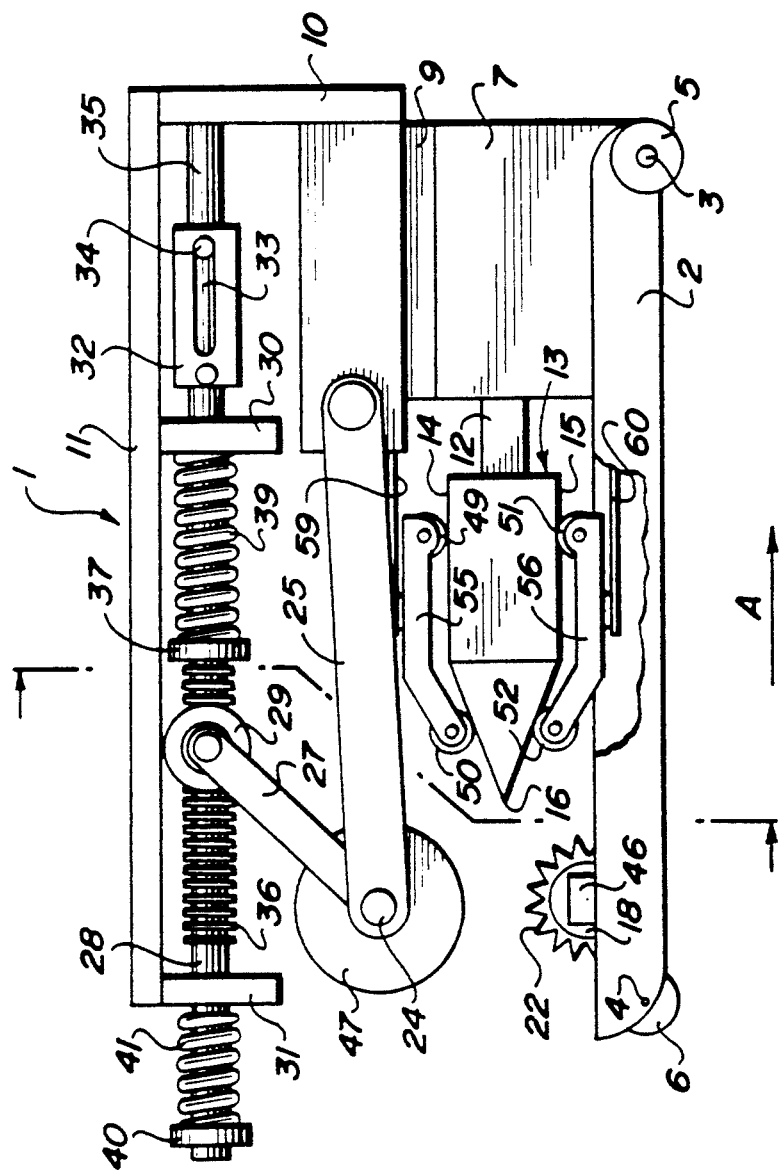
Figure 3:
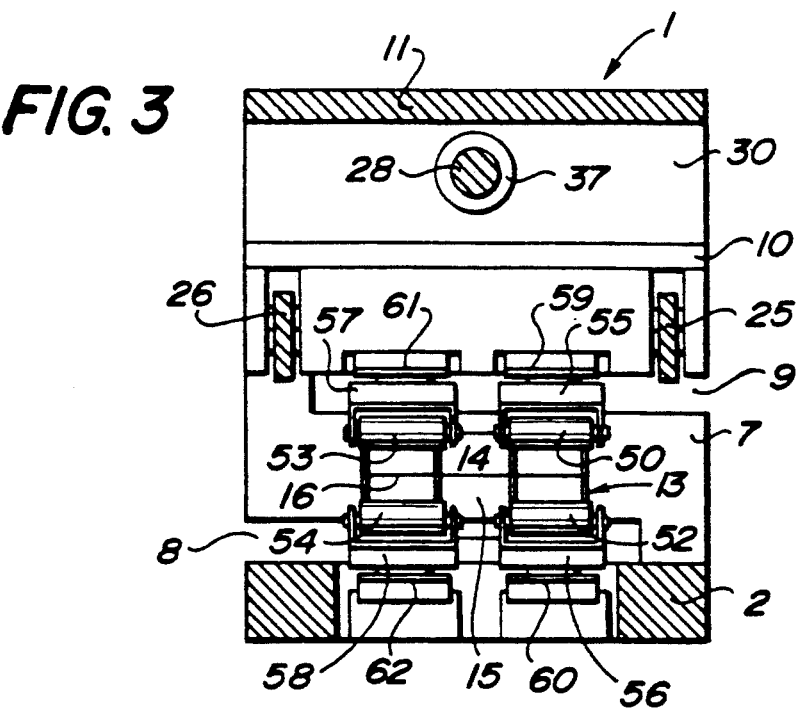

FIG. (2) shows a rear view of the device according to FIG. 1;

FIG. (3) shows a cross-section through the device according to FIGS. 1 and 2 in plane A—A (FIG. 1);

FIG. (4) shows a partial view of a contact roller pair of the device according to FIGS. 1 to 3 in a partial section; and FIG. (5) shows a frontal view of a contact roller of the device according to FIGS. 1 to 3 in a partial section.

DETAILED DESCRIPTION OF THE INVENTION

The device (1) shown in FIGS. (1) to (3) comprises a carriage (2) with two drive axles (3,4) which in the area of the front ends carry two wheels (5) and in the area of the rear end carry a roller (6). The device (1) may be driven in the direction of arrow A (FIG. 1).

The carriage (2), i.e. the area of the front end, holds a carrier (7) which is shaped—as is seen especially from FIGS. (2) and (3)—in such a way that it forms in the bottom area an insertion slot (8) which is open toward one side and in the top area an insertion slot (9) which is open toward the other side. Naturally, the insertion slots (8,9) are also open toward the front and back.

A carrier plate (10) is attached to the front wall of the carrier (7) which projects upward and at whose top end is attached a horizontal case plate (11) which extends over the entire width of the device (1).

A heater (13) is attached to the back end of the carrier (7) via a support rod (12). This heater has a top heating surface (14) and a bottom heating surface (15) which extend backwards at an angle and meet at a wedge tip (16). Hereby the heating surfaces (14,15) may also be divided transversely to the longitudinal axis of the device (1) (see DE-OS 35 35 759)—as is common in such devices in order to produce two parallel weld seams spaced at an interval to each other. The heater (13) here has heating rods which are not shown in detail here and which ensure heating of the heating surfaces (14,15). The possible arrangement of the heating rods and their control are found in DE-OS 40 00 017 and DE-OS 35 35 759.

Behind the wedge tip (16) of the heater (13), a top contact roller (17) and—facing it—two bottom contact rollers (18,19) are located. The top contact roller (17) is equipped with two circumferential sets of gear teeth (20,21) spaced at a distance from each other, while the bottom contact rollers (18,19) each carry a frontal set of gear teeth (22,23). The gear teeth sets (20,21,22,23) have approximately the same width and face each other correspondingly (FIG. 2).

The top contact roller (17) is positioned on a roller rotation axis (24) which is held at the back ends by two longitudinal connecting rods (25, 26) which extend essentially horizontally forward. The longitudinal connecting rods (25, 26) are positioned at the carrier (7) in such a way that they are able to swivel. In addition, a U-shaped support bow (27) engages with the roller rotation axis (24), i.e. on both sides of the contact roller (17). It is shown particularly in FIG. (1) that the support bow (27) extends in the shown position at an angle toward the top and spans on both sides a spindle nut which is not visible here and which is positioned on a spindle (28) which extends horizontally and in the longitudinal direction of the device (1). On both sides of the spindle nut, guide rollers (29) which are supported on the underside of the case plate (11) are positioned on the support bow (27).

The spindle (28) is positioned in the front and back rotatably and axially sliding in bearing plates (30,31) which are attached to the case plate (11). The spindle ends in front of the front bearing plate (30) in a coupling case (32) to which the spindle (28) is connected in a rotation-proof manner. The coupling case (32) does have two facing longitudinal slots (33) which engage in a form-fitting manner with a crossbar (34) which is held in a drive shaft (35). The drive shaft (35) may be rotated by an electric motor which is not shown here in detail. It is also held axially in a stationary manner.

The spindle (28) has a threaded section (36) on which the spindle nut located on the support bow (27) is positioned. In the area of the front end of the threaded section (36) a stop plate (37) is positioned on the spindle (28) and is fixed to this spindle (28). A helical spring (39) surrounding the spindle (28) is supported between this stop plate (37) and the front bearing plate (30).

The back end of the spindle (28) reaches through the rear bearing plate (31) and projects toward the back. It also has a stop plate (40) which is fixed to it at its free end. Between this stop plate (40) and the rear bearing plate (31) there is another helical spring (41) which also surrounds the spindle (28), but which is shorter than the distance between stop plate (40) and bearing plate (31). In this way, the helical spring (41) is only actuated after the first helical spring (39) has already been compressed by the differential length between the above mentioned distance and the length of the second helical spring (41), and in this manner the spring force is increased.

Figure 4:
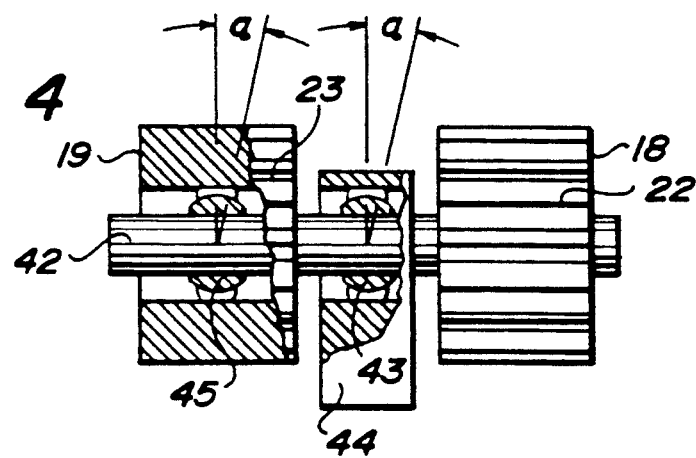

The bottom contact rollers (18,19) are positioned—as may be seen especially in FIG. (4)—on a roller rotation axis (42) which in the center between the two contact rollers (18,19) is kept in a bearing (43) which is located in a bearing bracket (44) connected tightly to the carriage (2). The bearing (43) not only permits rotation of the roller rotation axis (42) but also a swiveling of the roller rotation axis (42) about a swiveling axis (in FIG. 4 vertical to the drawing plane) which extends vertically in relation to it and horizontally, i.e. respectively toward both sides by the angle a drawn in FIG. (4). On the outside, the roller rotation axis (42) is guided in retainers (46,47) in such a manner that the roller rotation axis (42) is able to perform a vertical movement inside the retainers, but not a horizontal movement. Thus the movement of the roller rotation axis (42) is limited to the swiveling about the above mentioned swiveling axis—in addition to the rotation movement.

The contact rollers (18,19) are positioned on the roller rotation axis (42) with the same bearings (48) as those in the bearing bracket (44). The contact rollers (18,19) thus are able also to execute a swivel movement relative to the roller rotation axis (42), in particular by the angle a, drawn in FIG. (4), toward both sides, i.e. about a swivel axis extending vertically to the roller rotation axis (42) and horizontally (in FIG. (4) vertical to the drawing plane). In this way the contact rollers (18,19) may adjust themselves so that they are at different heights but nevertheless have parallel rotation axes.

In addition to the contact rollers (17,18,19) the device (1) also has drive rollers. For reasons of clarity they have not been shown here and are located behind—in FIG. (1) to the left of—the contact rollers (17,18,19). At least one of the drive rollers is coupled with an electric drive motor.

A total of eight contact rollers (49,50,51, 52, 53,54)—only six of these are shown in the drawings—also are arranged above and below the heating surfaces (14,15) of the heater (13). Two each contact rollers (49,50) or (50,51) or (53) or (54) are positioned consecutively in a bearing bridge (55,56,57,58) extending longitudinally in such a way that the respective frontal contact rollers (49,51) are located in the area of the horizontal sections of the heating surfaces (14,15), while the respective rear contact rollers (50,52,53,54) are located in the area of the wedge sections of the heating surfaces (14,15) so that the line of the bearing bridges (55,56,57,58) is bent. Two each bearing bridges (55,57) or (56,58) are arranged adjacently, whereby the distance between them corresponds approximately to the distance between the bottom contact rollers (18,19) or the circumferential gear tooth sets (20,21).

The bearing bridges (55,56,57,58) are attached to plate springs (59,60,61,62) which extend forward and at this point are tightly clamped into the carrier (7). The bearing bridges (55,56,57,58) thus each are subject to a preload of the plate springs (59,60,61,62) directed toward the heater (13), whereby the plate springs (59,60,61) also permit a swiveling of the bearing bridges (55,56,57,58) about an axis extending transversely to the longitudinal axis of device (1) and horizontally.

Figure 5:
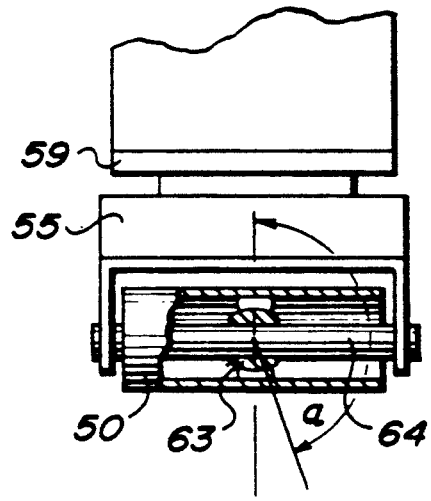

The adaptability of the contact rollers (49,50,51,52,53,54) is further increased by the fact that they may be swiveled similar to the bottom contact rollers (18,19) about a swivel axis which extends horizontally in the longitudinal direction of the device (1). This is seen from the view according to FIG. (5) which shows a partial cross-section of the contact roller (50). The contact roller (50) is positioned on a roller rotation axis (64) by way of a bearing (63), whereby the bearing is constructed in a bowl shape in such a way that it permits the previously mentioned swiveling (in FIG. 5 about an axis vertical to the drawing plane), so that the contact roller (50) may take an angled position relative to the roller rotation axis (64). The roller rotation axis (64) is held in the bearing bridge (55) which has a U-shaped cross-section. The other contact rollers (49,51,52,53,54) are positioned in the same manner.

The device (1) described above functions as follows when welding two overlapping foil edges. The device (1) is driven forward by the above-mentioned drive roller which are not shown in detail and which support themselves on the already welded foil edges. Hereby the foil edges enter into insertion slots (8,9) and then glide over the heating surfaces (14,15) of the heater (13). They are pressed by the contact rollers (49,50,51,52,53,54) onto the heating surfaces (14,15), whereby the contact rollers (49,50,51,52,53,54) are able to adapt to the surfaces of the foil edges. The heater (13) heats the foil edges on their facing sides to welding temperature. They are then passed over the wedge tip (16) into the area of the top and bottom contact rollers (17,18,19).

Compared to the position shown in FIG. 1, the latter have been positioned in such a way that the two foil edges are pressed onto each other with the required force. For this reason the spindle (28) has been set into rotation via the coupling case (32), the drive shaft (35), and the electric motor (not shown), in such a way that the support bow (27) has been moved backwards via the spindle nut. Because of the given kinematics, this movement of the spindle nut results in a swiveling of the longitudinal connecting rods (25,26) and thus of the top contact roller (17) downwards in the direction toward the bottom contact rollers (18,19). The gap between the top contact roller (17) and bottom contact rollers (18,19) may hereby be set precisely via the spindle (28).

To the extent that the foil edges have irregularities or carry pressed-in projecting rocks, the top contact roller

(17) is able to yield resiliently. The yielding movement is transferred via the support bow (27) and the spindle nut to the spindle (28) and presses the latter forward. During this process, it supports itself via the stop plates (37,40) on the helical springs (39,41), i.e. the movement is absorbed resiliently. The form-fitting between spindle (28) and drive shaft (35) is not lost in the process, since the longitudinal slots (33) permit an axial movement of the spindle (28) in this direction. In order to prevent vertical forces from acting on the spindle (28), the support bow (27) supports itself via guide rollers (29) on the underside of the case plate (11).

In addition, the bottom contact rollers (18,19) are able to adapt their position to the irregularities of the foil edges in such a way that the pressure stress on the foil edges nevertheless remains as constant as possible.

I claim:

1. A device for welding overlapping edges of a material, comprising:

a heater;

first and second oppositely disposed and spaced contact rollers located downstream of said heater for pressing therebetween overlapping edges of material to be heated by said heater; and an adjustment assembly for selectively adjusting and setting an initial distance between said first contact roller and said second contact roller, said adjustment assembly comprising a rotatable spindle operatively associated with said first contact roller, a motor, connecting means operably connecting said motor to said spindle for causing rotation thereof and for permitting said spindle to move in a first direction, and a bias means operatively associated with said and cooperating with said connecting means for maintaining substantially constant pressure on said first roller independent of said initial distance.

2. The device of claim 1 wherein said heater includes a plurality of longitudinally extending heating surfaces, each surface associated with one of said rollers.

3. The device of claim 2 wherein each heating surface includes a plurality of parallel heating surfaces.

4. The device of claim 1 wherein said means operably connecting said motor to said spindle is a sliding coupling.

5. The device of claim 4 wherein said sliding coupling rotatably engages both said spindle and said motor and is longitudinally slidable relative to said spindle and said motor.

6. The device of claim 1 wherein said spindle includes a threaded portion.

7. The device of claim 6 wherein a spindle nut is in threaded engagement with said spindle threaded portion and operatively associated with said first contact roller so that rotation of said spindle causes corresponding adjustment of said first roller.

8. The device of claim 1 further comprising a connecting rod extending between said spindle nut and said first contact roller.

9. The device of claim 1 wherein said bias means is a spring.

10. The device of claim 1 wherein said first contact rollers include axially spaced gear teeth and said second contact rollers include radially spaced gear teeth.

11. A device for welding overlapping edges of a material, comprising:

a longitudinally extending heater;

first and second sets of oppositely disposed and spaced contact rollers longitudinally spaced downstream of said heater for pressing therebetween overlapping edges of material to be heated by said heater; and an adjustment assembly for selectively adjusting and setting an initial distance between said first set of contact and said second set of contact, said adjustment assembly comprising a rotatable spindle operatively associated with said first set of contact rollers, a motor, connecting means operably connecting said motor to said spindle for causing rotation thereof and for permitting said spindle to move axially in a first direction, and at least a first bias means operatively associated with said spindle for and cooperating with said connecting means for maintaining substantially constant pressure on said first set of contact rollers independent of said initial distance.

12. The device of claim 11 wherein said first and second sets of contact rollers include a plurality of transversely spaced contact rollers.

13. The device of claim 12 wherein said second set of contact rollers swivel toward and away from said first set of contact rollers.

14. The device of claim 11 wherein said heater includes a plurality of transversely spaced parallel heating portions for heating overlapping edges of material along spaced parallel weld seams.

15. The device of claim 14 wherein said parallel heating portions include first and second oppositely disposed parallel heating surfaces and third and fourth converging heating surfaces extending from the downstream end of said first and second heating surfaces.

16. The device of claim 15 further comprising upstream and downstream rollers operatively associated with said heater surfaces for pressing edges of material against said heater surfaces.

17. The device of claim 11 wherein said first contact rollers include axially spaced gear teeth and said second contact rollers include radially spaced gear teeth.

* * * * *